US011984103B2

(12) United States Patent
Sato et al.

(10) Patent No.: US 11,984,103 B2
(45) Date of Patent: May 14, 2024

(54) DISPLACEMENT AMOUNT DETECTING APPARATUS AND ELECTRONIC WIND INSTRUMENT

(71) Applicant: Roland Corporation, Shizuoka (JP)

(72) Inventors: Hitoshi Sato, Shizuoka (JP); Ryohei Kanayama, Shizuoka (JP); Kentaro Mori, Shizuoka (JP)

(73) Assignee: Roland Corporation, Shizuoka (JP)

( * ) Notice: Subject to any disclaimer, the term of this patent is extended or adjusted under 35 U.S.C. 154(b) by 571 days.

(21) Appl. No.: 17/353,832

(22) Filed: Jun. 22, 2021

(65) Prior Publication Data

US 2021/0312896 A1 Oct. 7, 2021

Related U.S. Application Data

(63) Continuation-in-part of application No. 17/057,106, filed as application No. PCT/JP2018/020105 on May 25, 2018, now Pat. No. 11,830,465.

(51) Int. Cl.
*G10H 1/32* (2006.01)
*G10D 7/14* (2020.01)

(52) U.S. Cl.
CPC ................. *G10H 1/32* (2013.01); *G10D 7/15* (2020.02); *G10H 2230/205* (2013.01)

(58) Field of Classification Search
CPC ....... G10H 1/32; G10H 2230/205; G10D 7/15
USPC ............................................................ 84/743
See application file for complete search history.

(56) References Cited

U.S. PATENT DOCUMENTS 5,140,888 A * 8/1992 Ito ............................ G10H 1/32 84/723
5,340,942 A * 8/1994 Kunimoto .............. G10H 5/007 84/661
5,543,580 A * 8/1996 Masuda ................. G10H 5/007 84/723

(Continued)

FOREIGN PATENT DOCUMENTS

CN 105989820 10/2016
CN 105989820 A * 10/2016 ........... G10H 1/0551

(Continued)

OTHER PUBLICATIONS

Office Action of China Counterpart Application, with English translation thereof, issued on Jan. 15, 2024, pp. 1-21.

*Primary Examiner* — Christina M Schreiber
(74) *Attorney, Agent, or Firm* — JCIPRNET

(57) ABSTRACT

A displacement amount detecting apparatus is provided and includes: transmission member, transmitting a displacement on one end side thereof to a displacement on the other end side thereof; a sensor, disposed to face the other end side of the transmission member, and configured to output a value according to a distance between the sensor and the other end side of the transmission member; a calculation device, calculating a value for indicating the distance based on the value output by the sensor and a reference value; and a correction device, correcting the reference value. When the one end side is displaced in a first direction, the other end side is displaced in a second direction opposite to the first direction and away from the sensor. The correction device is configured to correct the reference value based on the value for indicating the distance calculated by the calculation device.

12 Claims, 10 Drawing Sheets

(56) References Cited

U.S. PATENT DOCUMENTS

| | | | | |
|---|---|---|---|---|
| 6,570,077 | B1 * | 5/2003 | Goss | G09B 15/06 84/383 R |
| 7,896,742 | B2 * | 3/2011 | Weston | A63J 21/00 463/37 |
| 8,089,458 | B2 * | 1/2012 | Barney | A63F 13/31 345/158 |
| 2005/0217464 | A1 * | 10/2005 | Onozawa | G10H 1/34 84/723 |
| 2007/0017352 | A1 * | 1/2007 | Masuda | G10H 5/007 84/658 |
| 2007/0144336 | A1 * | 6/2007 | Fujii | G10H 3/24 84/723 |
| 2008/0295669 | A1 * | 12/2008 | Hashimoto | G10D 9/03 84/398 |
| 2009/0019999 | A1 * | 1/2009 | Onozawa | G10H 1/34 84/171 |
| 2009/0020000 | A1 * | 1/2009 | Onozawa | G10D 7/00 84/723 |
| 2009/0188375 | A1 * | 7/2009 | Jancic | G09B 15/00 84/465 |
| 2016/0275929 | A1 * | 9/2016 | Harada | G10H 1/46 |
| 2018/0075831 | A1 * | 3/2018 | Toyama | G10H 3/16 |
| 2018/0082664 | A1 * | 3/2018 | Sasaki | H03H 7/01 |
| 2018/0090120 | A1 * | 3/2018 | Kasuga | G10H 1/043 |
| 2018/0218720 | A1 * | 8/2018 | Smith | G10H 3/26 |
| 2018/0268791 | A1 * | 9/2018 | Okuda | G10H 1/344 |
| 2019/0005931 | A1 * | 1/2019 | Kasuga | G10H 1/0551 |
| 2019/0019485 | A1 * | 1/2019 | Toyama | G10H 1/46 |
| 2019/0122644 | A1 * | 4/2019 | Mueller | G10D 7/06 |
| 2021/0201871 | A1 * | 7/2021 | Sato | G10H 1/32 |
| 2021/0201872 | A1 * | 7/2021 | Sato | G10D 9/02 |
| 2021/0272544 | A1 * | 9/2021 | Kashiwase | G10H 1/32 |
| 2021/0304714 | A1 * | 9/2021 | Miyazaki | G10H 1/0008 |
| 2021/0312896 | A1 * | 10/2021 | Sato | G10H 1/32 |

FOREIGN PATENT DOCUMENTS

| | | | | | |
|---|---|---|---|---|---|
| JP | H0335595 | U | * | 4/1991 | |
| JP | 2010164610 | A | * | 7/2010 | G10H 1/348 |
| JP | 2016080893 | A | * | 5/2016 | |

* cited by examiner

DISPLACEMENT AMOUNT DETECTING APPARATUS AND ELECTRONIC WIND INSTRUMENT

CROSS-REFERENCE TO RELATED APPLICATION

This application is a continuation in part of and claims the priority benefit of U.S. patent application Ser. No. 17/057,106, filed on Nov. 20, 2020, now in pending, which is a 371 application of the international PCT application serial no. PCT/JP2018/020105, filed on May 25, 2018. The entirety of the above-mentioned patent application is hereby incorporated by reference herein and made a part of this specification.

TECHNICAL FIELD

The present invention relates to an electronic wind instrument, and particularly, to an electronic wind instrument that can accurately detect an amount of rotation of a transmission member.

BACKGROUND ART

A technology in which a reed is provided in a blow port into which exhaled air is blown by a performer, and an amount of biting on the reed when the reed is bitten by the performer is detected by a sensor is known. For example, Patent Literature 1 and Patent Literature 2 describe an electronic wind instrument in which one end of a cantilever (transmission member) that rotates around a predetermined axis is brought into contact with an inner surface of a reed and a Hall element (sensor) is disposed to face a magnet fixed to the other end of the cantilever. According to the electronic wind instrument, the transmission member rotates when the reed is bitten, a distance between the magnet and the Hall element changes, and thus an amount of biting on the reed can be detected according to the change in the distance (magnetic field).

CITATION LIST

Patent Literature

[Patent Literature 1]: Japanese Patent Laid-Open No. S63-289591 (for example, FIG. 1)

[Patent Literature 2]: Japanese Patent Laid-Open No. S63-318597 (for example, FIG. 1)

However, in the above technologies described in Patent Literature 1 and Patent Literature 2, when the reed is bitten, since the other end of the transmission member rotates close to the sensor, if there is a predetermined amount or more of biting on the reed, there is a risk of the transmission member coming in contact with the sensor. In order to prevent this contact, for example, if a distance between the other end of the transmission member and the sensor which face each other in the initial state (a state before the reed is bitten) is set to be relatively large, the detection sensitivity of the sensor decreases and thus it is difficult to accurately detect an amount of rotation of the transmission member.

In addition, in the technology described in Patent Literature 1, an elastic sealing member (elastic member) for returning the transmission member to the initial state covers an outer circumferential surface of a core (a member that pivotally supports the transmission member) and a mouthpiece (blow port) is fitted into the outer circumferential surface. Therefore, there is a risk of the elastic member being deformed when the mouthpiece is fitted into the core and an elastic force applied from the elastic member to the transmission member changing. When a distance between the transmission member and the sensor which face each other in the initial state is changed due to the change in the elastic force, it is difficult to accurately detect an amount of rotation of the transmission member.

Specifically, the above technologies in the related art have a problem that it is not possible to accurately detect an amount of rotation of the transmission member.

Moreover, the problem of dimensional error during assembling the parts of the electronic wind instrument remains. Besides, if an impact is applied in a situation that the blow port unit is removed and the transmission member is exposed, the dimensional error will increase.

The present invention has been made in order to address the above problems, and provides an electronic wind instrument that can accurately detect an amount of rotation of a transmission member.

SUMMARY

The present invention provides an embodiment of a displacement amount detecting apparatus which includes: a transmission member, a sensor, a calculation device and a correction device. The transmission member is configured to transmit a displacement on one end side thereof to a displacement on the other end side thereof. The sensor is disposed to face the other end side of the transmission member, and is configured to output a value according to a distance between the sensor and the other end side of the transmission member. The calculation device is configured to calculate a value for indicating the distance based on the value output by the sensor and a reference value. The correction device is configured to correct the reference value. When the one end side is displaced in a first direction, the other end side is displaced in a second direction opposite to the first direction and away from the sensor. The correction device is configured to correct the reference value based on the value for indicating the distance calculated by the calculation device.

The present invention also provides an embodiment of an electronic wind instrument which includes: an instrument main body, a blow port, a reed and the displacement amount detecting apparatus. The blow port is attached to one end of the instrument main body and has a cavity therein. The reed is attached to the blow port and is configured to be displaceable toward the cavity when bitten by a performer. The displacement amount detecting apparatus includes: a transmission member, configured to transmit a displacement on one end side thereof to a displacement on the other end side thereof, and the transmission member being configured to be rotatable around a predetermined axis with displacement of the reed when one end of the transmission member is brought into contact with the reed; a sensor, disposed to face the other end side of the transmission member, and configured to output a value according to a distance between the sensor and the other end side of the transmission member, and the sensor being disposed to face a detection unit on the other end side of the transmission member and measures a distance between the sensor and the detection unit, wherein when the reed is displaced due to being bitten by the performer, the detection unit of the transmission member rotates away from the sensor; a calculation device, configured to calculate a value for indicating the distance based on the value output by the sensor and a reference value; and a correction device, configured to correct the reference value. When the one end side is displaced in a first direction, the other end side is displaced in a second direction opposite to the first direction and away from the sensor, and the correction device is configured to correct the reference value based on the value for indicating the distance calculated by the calculation device.

DESCRIPTION OF THE EMBODIMENTS

Figure 1:
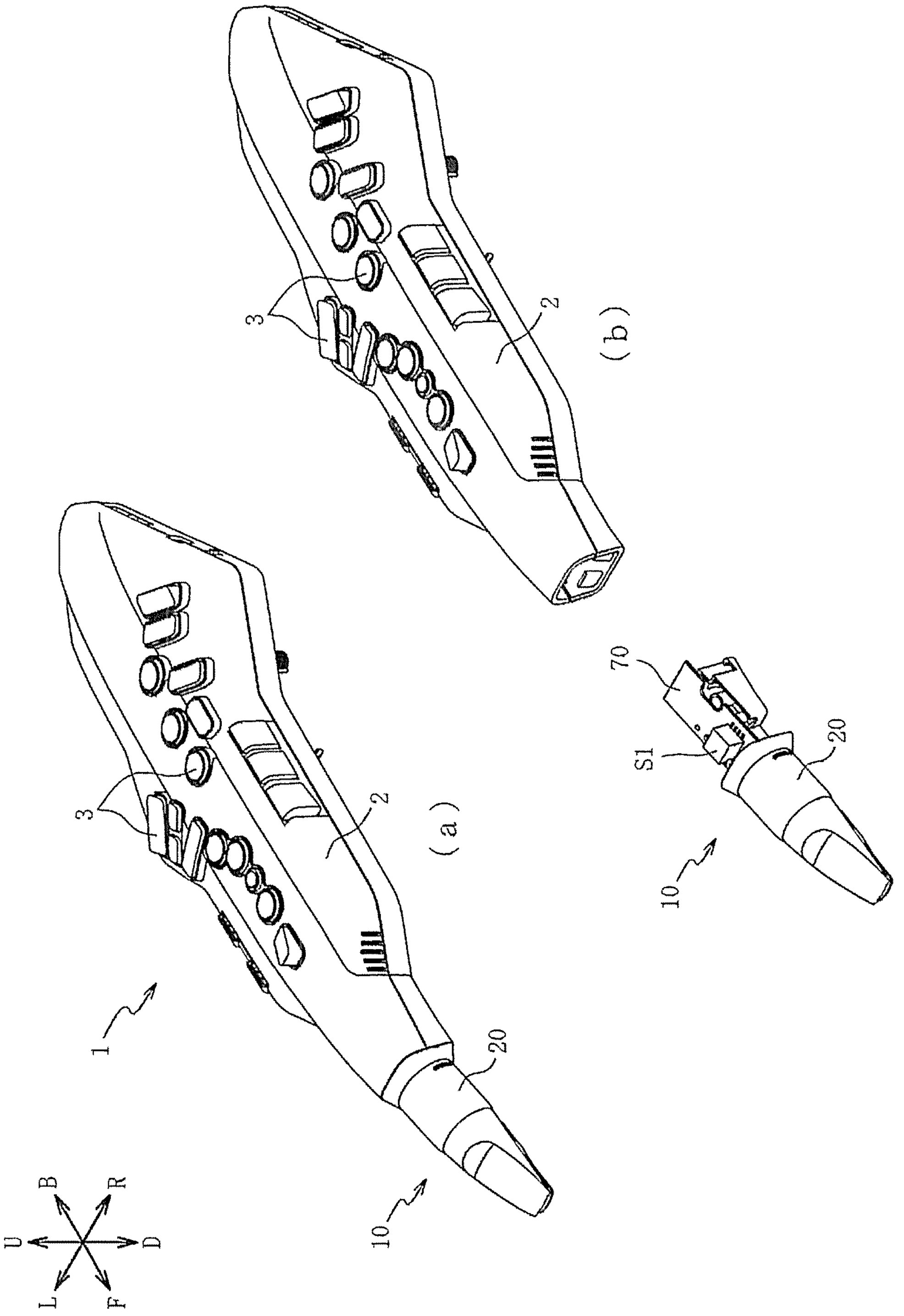
In FIG. 1, (a) is a perspective view of an electronic wind instrument according to one embodiment, and (b) is an exploded perspective view of the electronic wind instrument.

Exemplary embodiments will be described below with reference to the appended drawings. First, a schematic configuration of an electronic wind instrument 1 will be described with reference to FIG. 1. In FIG. 1, (a) is a perspective view of the electronic wind instrument 1 according to one embodiment, and (b) is an exploded perspective view of the electronic wind instrument 1. Here, in the drawings, the arrow U direction, the arrow D direction, the arrow F direction, the arrow B direction, the arrow L direction, and the arrow R direction indicate upward, downward, forward, rearward, left, and right with respect to the electronic wind instrument 1, respectively. However, the vertical direction, the front to rear direction, and the left to right direction with respect to the electronic wind instrument 1 need not always match the vertical direction, the front to rear direction, and the left to right direction when the electronic wind instrument 1 is used.

As shown in FIG. 1, the electronic wind instrument 1 is an electronic musical instrument that simulates a saxophone. The electronic wind instrument 1 includes an instrument main body 2 in which various electronic components are accommodated, a plurality of operators 3 that are provided on the outer surface (for example, an upper surface and left and right side surfaces) of the instrument main body 2, and a blow port unit 10 attached to the instrument main body 2.

The instrument main body 2 is a housing in which a breath sensor S1, a substrate 70 to which the breath sensor S1 is fixed, and the like are accommodated. The instrument main body 2 is formed such that it is longest in the front to rear direction, and the blow port unit 10 is fixed to one end (front end) in the longitudinal direction. The blow port unit 10 is a unit for generating a musical sound signal based on the strength of exhaled air blown by a performer, and the breath sensor S1 is fixed to the substrate 70 of the blow port unit 10.

The breath sensor S1 is a pressure sensor that detects a change in atmospheric pressure due to blowing of exhaled air. The presence or absence and strength of exhaled air blown into a blow port 20 of the blow port unit 10 is detected by the breath sensor S1, and the volume of a musical sound generated based on the detection result and the like are controlled.

The operator 3 is a switch for performing various settings for, a pitch of a generated musical sound signal, a play mode, an effect imparted to a musical sound, and the like. Therefore, for example, an electronic sound simulating a saxophone is generated by operating the operator 3 and blowing exhaled air into the blow port 20.

The blow port unit 10 is fixed to the instrument main body 2 when the electronic wind instrument 1 is used, but is removable from the instrument main body 2 while members constituting the blow port unit 10 are formed as units (refer to (b) of FIG. 1).

Figure 2:
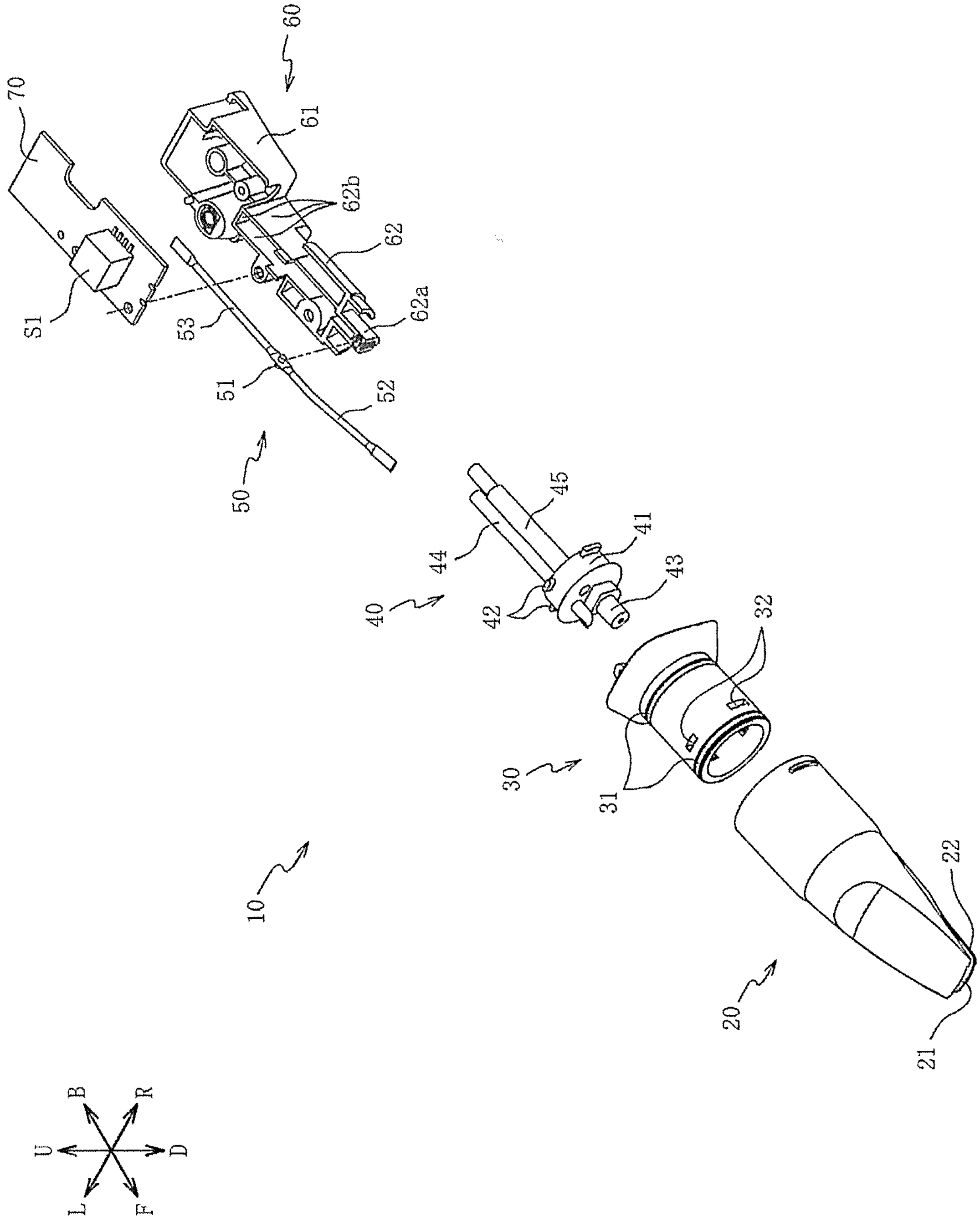
FIG. 2 is an exploded perspective view of a blow port unit.

Next, a detailed configuration of the blow port unit 10 will be described with reference to FIG. 2. FIG. 2 is an exploded perspective view of the blow port unit 10.

As shown in FIG. 2, the blow port unit 10 includes the blow port 20 that simulates a mouthpiece, a cylindrical member 30 having an outer circumferential surface into which the blow port 20 is fitted and having a cylindrical shape, an elastic member 40 that is fixed to an inner circumferential surface of the cylindrical member 30, a transmission member 50 that is inserted into the elastic member 40, a support member 60 that supports the transmission member 50, and the substrate 70 that is supported by the support member 60.

The front end side of the blow port 20 is formed in a tapered cylindrical shape, and a cavity is formed therein. An opening part 21 is formed on the front end side of the cavity of the blow port 20, and a reed 22 is attached to the blow port 20 so that it covers a part of the opening part 21 (a part of the opening part 21 is blocked by the reed 22).

The reed 22 is a valve element formed using a resin material, and is formed with a predetermined elasticity (to the extent that it can be deformed when bitten by a performer). When the performer plays the electronic wind instrument 1 while biting the reed 22, it is possible to add vibrato to the generated musical sound and control the pitch.

The cylindrical member 30 is a member for holding the blow port 20 detachably. The cylindrical member 30 includes a pair of sealing members 31 which are provided on the outer circumferential surface and provided with a predetermined interval therebetween in the axial direction, and a through-hole 32 formed at a region between the pair of sealing members 31.

A pair of grooves are formed in the circumferential direction on the outer circumferential surface of the cylindrical member 30, and the sealing member 31 is fitted into each of the pair of grooves. The sealing member 31 is an annular O-ring formed using a rubber-like elastic component.

The through-hole 32 is a hole that extends in the radial direction of the cylindrical member 30. A plurality (4, in the present embodiment) of through-holes 32 are formed at equal intervals in the circumferential direction of the cylindrical member 30, and the elastic member 40 is fitted into the plurality of through-holes 32.

The elastic member 40 includes a cylindrical part 41 having a blocked front end side and a cylindrical shape, a plurality of projections 42 that protrude in the radial direction from the outer circumferential surface of the cylindrical part 41, an elastic part 43 that protrudes from a front surface of the cylindrical part 41, and an introduction pipe 44 and a drain pipe 45 formed above the elastic part 43, and these parts are integrally formed using a rubber-like elastic component.

The plurality (4, in the present embodiment) of projections 42 are formed on the outer circumferential surface of the cylindrical part 41 at positions in the circumferential direction corresponding to the through-holes 32 of the cylindrical member 30. When the plurality of projections 42 are fitted into the through-holes 32, the elastic member 40 is fixed inside the cylindrical member 30.

The elastic part 43 is a part for applying an elastic force (a force for returning to the initial state) to the transmission member 50. The elastic part 43 is formed in a substantially cylindrical shape and has a configuration in which the transmission member 50 can be inserted into the inside of the elastic part 43 from the rear side to the front side of the cylindrical part 41.

The introduction pipe 44 is a pipe for introducing exhaled air into the breath sensor S1 and its rear end is fitted into the breath sensor S1. The introduction pipe 44 allows the front surface side and the rear surface side of the cylindrical part 41 to communicate with each other, and its front end is formed to protrude forward from the front surface of the cylindrical part 41.

The drain pipe 45 is a pipe for discharging exhaled air blown into the cavity of the blow port 20 and water contained in the exhaled air (or water generated by condensation) to the outside, and the front surface side and the rear surface side of the cylindrical part 41 are communicating via the drain pipe 45. Here, although not shown, a discharge hose is connected to the rear end of the drain pipe 45, and exhaled air and water flowing into the drain pipe 45 are discharged to the outside through the discharge hose.

The transmission member 50 is a rod-shaped member that extends longitudinally and a rotation shaft 51 is formed substantially at the center thereof. The rotation shaft 51 whose axes are directed to the left and right is formed so that it protrudes from a side surface of the transmission member 50, and the rotation shaft 51 is supported by the support member 60. Here, in the following description, a part of the transmission member 50 in front of the rotation shaft 51 is defined as a front section 52, and a part of the transmission member 50 behind the rotation shaft 51 is defined as a rear section 53.

The support member 60 includes a fixing part 61 fixed to the instrument main body 2 (refer to FIG. 1) and a support part 62 that extends forward from the fixing part 61 and supports the transmission member 50.

At the front end of the support part 62, a shaft support 62*a* that rotatably supports the rotation shaft 51 of the transmission member 50 is formed. On the rear side of the shaft support 62*a*, a concave accommodation space (hereinafter simply referred to as an "accommodation space") in which the rear section 53 of the transmission member 50 can be accommodated is formed. That is, the support part 62 is formed with a wall part 62*b* (a wall that extends upward from the bottom surface of the accommodation space) that surrounds the rear section 53 of the transmission member 50 from three sides, and the substrate 70 is supported on the upper surface on the rear end side of the wall part 62*b* and the upper surface of the fixing part 61.

Figure 3:
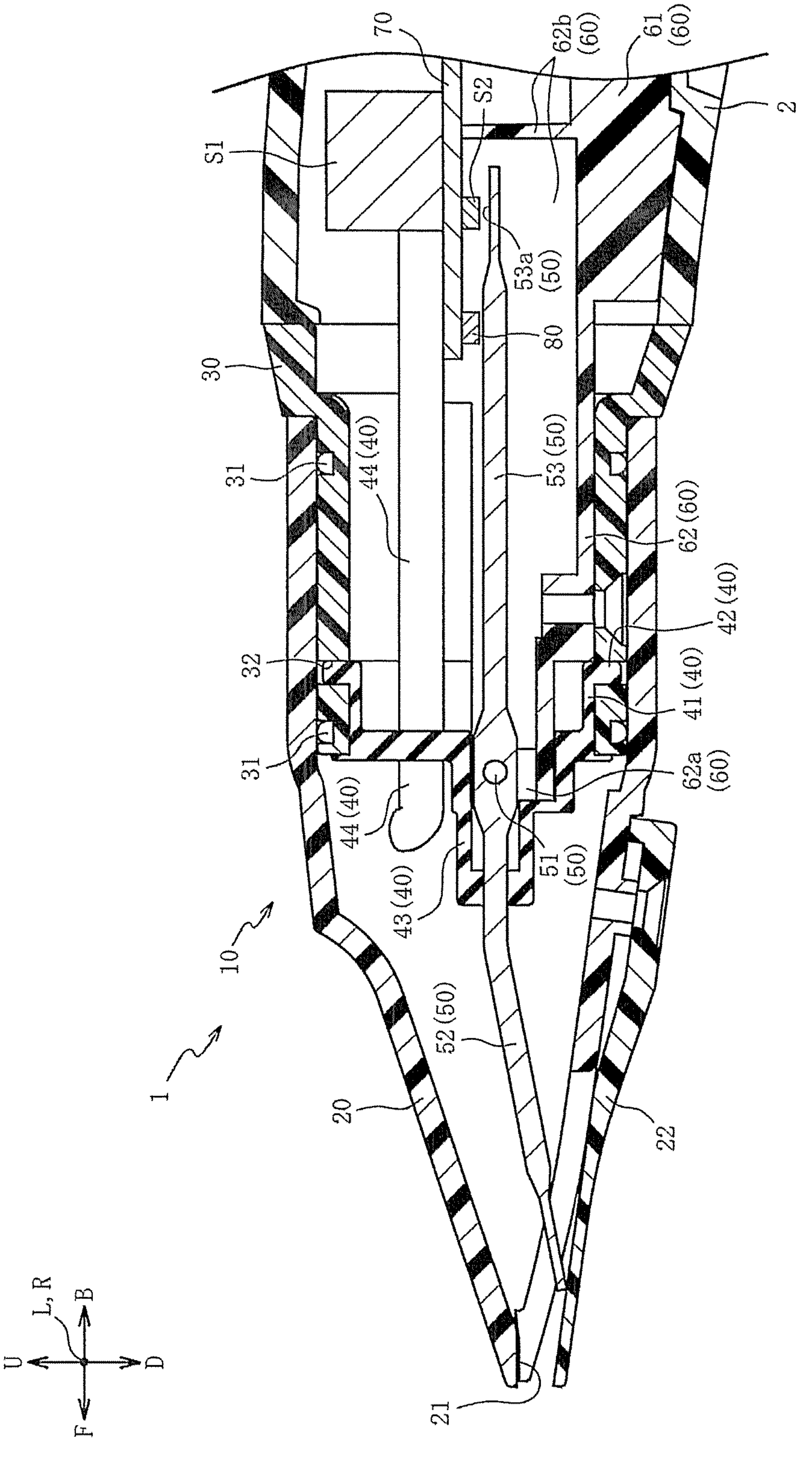
FIG. 3 is a partially enlarged cross-sectional view of the electronic wind instrument.

Next, an assembled state of the blow port unit 10 will be described with reference to FIG. 3. FIG. 3 is a partially enlarged cross-sectional view of the electronic wind instrument 1. Here, FIG. 3 shows a cross section cut along a plane orthogonal to the rotation shaft 51 of the transmission member 50 and a cross section of the transmission member 50 at the center in the left to right direction. In addition, in order to simplify the drawings, in FIG. 3, a part of the electronic wind instrument 1 is not shown, and hatching of a part of the cross section is omitted.

As shown in FIG. 3, the fixing part 61 of the support member 60 is fixed to the lower inner surface of the instrument main body 2 with a screw (not shown), and thereby the blow port unit 10 is fixed to the instrument main body 2. In addition, the support part 62 of the support member 60 is inserted into the inside of the cylindrical member 30, and the bottom surface of the support part 62 and the inner circumferential surface of the cylindrical member 30 are fixed with a screw (not shown).

The cylindrical part 41 of the elastic member 40 is fitted to the inner circumferential surface on the front end side of the cylindrical member 30, and a flange part that projects in a flange shape in the radial direction is formed on the front surface of the cylindrical part 41. The flange part is hooked on the opening edge of the front end of the cylindrical member 30, the projection 42 of the elastic member 40 is fitted into the through-hole 32 of the cylindrical member 30, and thus the elastic member 40 is fixed to the cylindrical member 30. Therefore, the elastic part 43 of the elastic member 40 and the front end of the introduction pipe 44 protrude forward from the front end of the cylindrical member 30.

Here, although not shown, a fixing component for pressing the cylindrical part 41 toward the cylindrical member 30 (upward) is fixed to the inner circumferential surfaces on the upper end side of the cylindrical member 30 and the cylindrical part 41. Such a fixing component is fixed to the inner circumferential surface of the cylindrical member 30 with a screw, and the cylindrical part 41 is interposed between the cylindrical member 30 and the fixing member with a fastening force of the screw.

The outer diameter of the cylindrical member 30 is set to be slightly smaller than the inner diameter of the blow port 20, and the blow port 20 is detachably attached to the outer circumferential surface of the cylindrical member 30. Thereby, since only the blow port 20 can be detached from the cylindrical member 30 (the side of the instrument main body 2), it is possible to easily perform maintenance (cleaning or replacement) of the blow port 20.

Since the sealing member 31 formed using a rubber-like elastic component is provided between the inner circumferential surface of the blow port 20 and the outer circumferential surface of the cylindrical member 30, it is possible to secure an airtight state at the fitting part between the blow port 20 and the cylindrical member 30 by the sealing member 31. In this case, on the outer circumferential surface of the cylindrical member 30, when a region in which the sealing member 31 is provided (the size of the sealing member 31 in the axial direction) is large, it is possible to perform sealing (airtightness) reliably, but it is difficult to detach the blow port 20 from the cylindrical member 30.

On the other hand, in the present embodiment, a pair of sealing members 31 are provided with a predetermined interval therebetween in the axial direction of the cylindrical member 30, and a length of the blow port 20 fitted into the cylindrical member 30 in the axial direction of the cylindrical member 30 (a length of the cylindrical member 30 inserted from the rear end of the blow port 20 into the front end of the cylindrical member 30) is set to be longer than the outer diameter of the cylindrical member 30. Thereby, when a region in which the sealing member 31 is provided (the size in the axial direction) is as small as possible, it is possible to minimize play between the outer circumferential surface of the cylindrical member 30 and the inner circumferential surface of the blow port 20 and secure sealing performance.

In addition, since the pair of sealing members 31 are provided at both ends of the outer circumferential surface of the cylindrical member 30 in the axial direction (a distance between the pair of sealing members 31 in the axial direction is set to 60% or more of a length of the blow port 20 fitted into the cylindrical member 30), it is possible to minimize play between the outer circumferential surface of the cylindrical member 30 and the inner circumferential surface of the blow port 20.

In addition, the through-hole 32 is formed in a region between the pair of sealing members 31, the projection 42 is fitted into the through-hole 32, and the elastic member is fixed to the inner circumferential surface of the cylindrical member 30, and thus it is possible to prevent the length of the cylindrical member 30 in the axial direction from being too long. That is, when the elastic member 40 is fixed to the cylindrical member using a region between the pair of sealing members 31, it is possible to reduce the size of the cylindrical member 30 while securing as long a length of the blow port 20 fitted into the cylindrical member 30 (a distance between the pair of sealing members 31 that face each other) as possible.

In addition, when the elastic member 40 is fixed using the inner circumferential surface of the cylindrical member 30, since it is not necessary to separately provide a part for fixing the elastic member 40 to the cylindrical member 30, it is possible to reduce the size of the cylindrical member 30.

The front end (the shaft support 62*a*) of the support part 62 of the support member 60 is fitted from the rear side of the elastic part 43 of the elastic member 40, and the transmission member 50 is inserted into the inside of the elastic part 43. Thereby, a part of the front section 52 of the transmission member 50 is covered with the elastic part 43.

When the blow port 20 is fitted into the cylindrical member 30, since the front section 52 (front end) of the transmission member 50 comes in contact with the inner surface of the reed 22 of the blow port 20, the transmission member 50 slightly rotates around the rotation shaft 51. Since the elastic part 43 is elastically deformed with this rotation, the front section 52 of the transmission member 50 is pressed against the inner surface (downward) of the reed 22 with a restoring force of the elastic part 43. Here, a state before the front end of the transmission member 50 comes in contact with the inner surface of the reed 22 and the reed 22 is bitten by the performer is defined as an "initial state."

In the initial state, the rear section 53 of the transmission member 50 is provided so that it linearly extends toward the instrument main body 2 and extends to the bottom surface side of the substrate 70. An optical sensor S2 is fixed to the bottom surface of the substrate 70, and the rear section 53 of the transmission member 50 is disposed to face the lower side of the optical sensor S2. The optical sensor S2 is an optical sensor including a light emitting section that emits light (infrared rays) to the rear section 53 and a light-receiving section that receives light reflected from the rear section 53.

On the rear section 53 of the transmission member 50, a flat surface 53*a* perpendicular to an optical axis direction of the optical sensor S2 is formed at the tip (a part that faces the optical sensor S2 vertically), and light is emitted from the optical sensor S2 to the flat surface 53*a*. Therefore, when the transmission member 50 rotates around the rotation shaft 51, the change in the distance from the optical sensor S2 to the flat surface 53*a* is measured by the optical sensor S2, and the amount of rotation of the transmission member 50 can be detected according to the change in the distance. Therefore, compared to a configuration in which the amount of rotation of the transmission member 50 is detected using a Hall element, it is not necessary to attach a magnet to the transmission member 50, and thus it is possible to improve assemblability.

Figure 4:
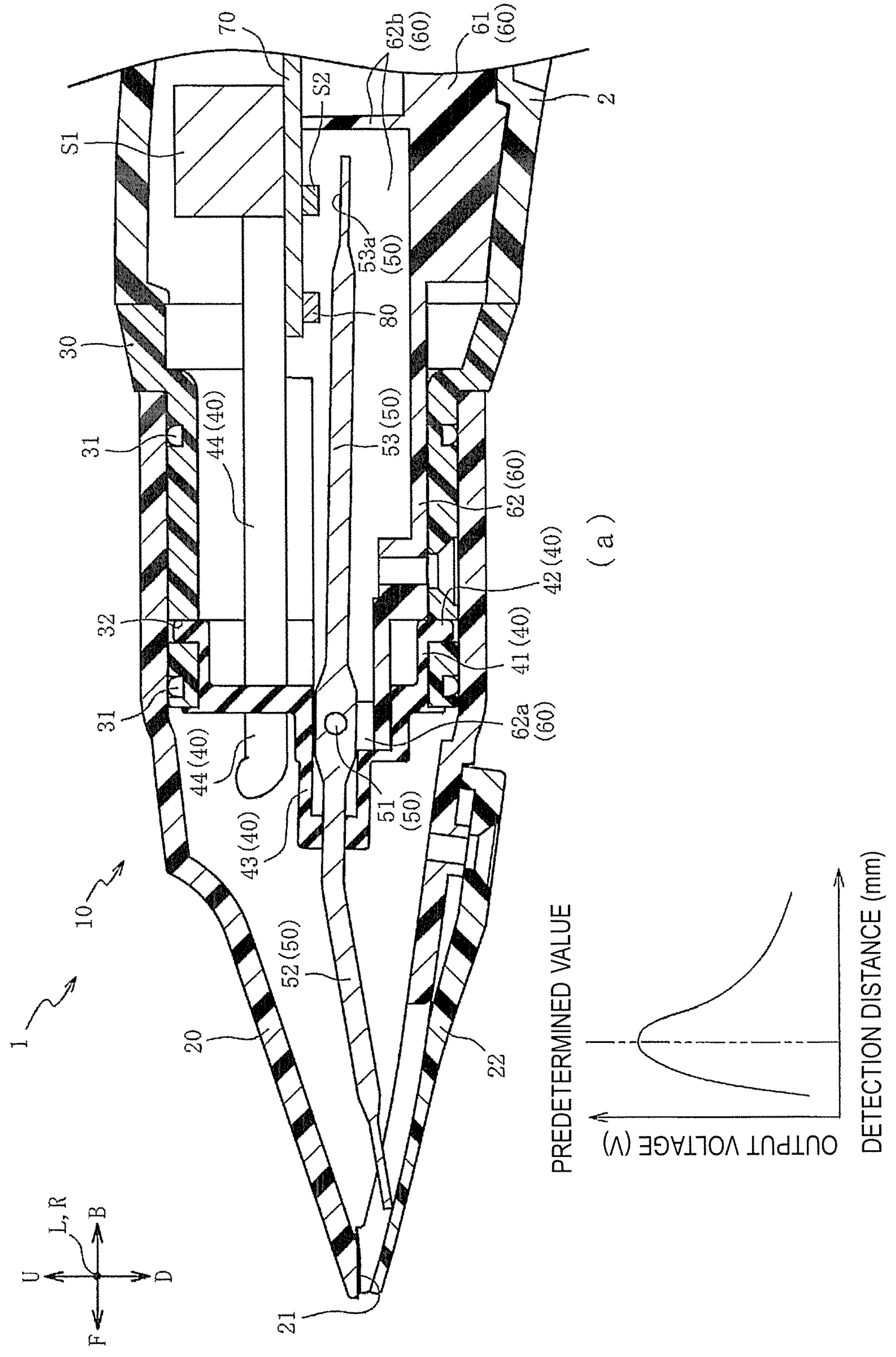
In FIG. 4, (a) is a partially enlarged cross-sectional view of an electronic wind instrument showing a state in which a reed is bitten in the state in FIG. 3, and (b) is a graph showing output characteristics of an optical sensor.

Next, a case in which the reed 22 is bitten by the performer will be described with reference to FIG. 4. In FIG. 4, (a) is a partially enlarged cross-sectional view of the electronic wind instrument 1 showing a state in which the reed 22 is bitten in the state in FIG. 3, and (b) is a graph showing output characteristics of the optical sensor S2. Here, in (b) of FIG. 4, the vertical axis represents an output voltage (V) of the optical sensor S2, and the horizontal axis represents a detection distance (mm) between the optical sensor S2 and an object to be measured.

As shown in (a) of FIG. 4, when the reed 22 is bitten by the performer, the reed 22 is displaced toward the cavity inside the blow port 20, and the front section 52 of the transmission member 50 rotates upward around the rotation shaft 51 with this displacement. With this rotation, the rear section 53 of the transmission member 50 rotates downward, and the optical sensor S2 is fixed to the side opposite to the rotation direction.

Thereby, since the rear section 53 of the transmission member 50 rotates away from the optical sensor S2, even if there is a predetermined amount or more of biting on the reed 22, it is possible to prevent the flat surface 53*a* of the rear section 53 from coming into contact with the optical sensor S2. Therefore, when the detection, sensitivity of the optical sensor S2 can be increased by setting a distance between the flat surface 53*a* and the optical sensor S2 which face each other to be relatively small in the initial state, it is possible to accurately detect the amount of rotation of the transmission member 50 (the amount of biting on the reed 22).

Here, output characteristics of the optical sensor S2 will be described. As shown in (b) of FIG. 4, the optical sensor S2 has output characteristics in which, when a distance to an object to be measured is a predetermined value (for example, about 1 mm), the output voltage reaches a peak (for example, 3 V), and the output voltage gradually decreases from the predetermined value as the object to be measured moves away.

Therefore, for example, in a configuration in which, when the reed 22 is bitten, the flat surface 53*a* rotates toward the optical sensor S2 (a detection distance becomes shorter), a distance between the optical sensor S2 and the flat surface 53*a* is smaller than the predetermined value, and there is a risk of the output voltage of the optical sensor S2 exceeding the peak. Therefore, although the flat surface 53*a* is actually displaced toward the optical sensor S2, there is a risk of erroneous detection that the flat surface 53*a* is displaced away from the optical sensor S2.

In addition, in order to minimize erroneous detection, if a distance between the optical sensor S2 and the flat surface 53*a* which face each other in the initial state is set to be relatively large, it is difficult to accurately detect the amount of rotation of the transmission member 50 because the sensitivity (output voltage) of the optical sensor S2 decreases.

On the other hand, in the present embodiment, since a distance between the flat surface 53*a* and the optical sensor S2 which face each other in the initial state is set to be larger than a predetermined value (for example, 1.5 mm), and the flat surface 53*a* rotates away from the optical sensor S2 when the reed 22 is bitten, it is possible to prevent inversion of the output value of the optical sensor S2 described above. In addition, since a distance between the flat surface 53*a* of the transmission member 50 and the optical sensor S2 which face each other in the initial state is set to be as small as possible, it is possible to accurately detect the amount of rotation of the transmission member 50.

In this manner, when the amount of rotation of the transmission member 50 is detected using the optical sensor S2, in order to increase the detection accuracy, it is preferable to set a distance between the flat surface 53*a* of the transmission member 50 and the optical sensor S2 which face each other in the initial state as small as possible (to the extent that the peak of the output of the optical sensor S2 is not exceeded). In addition, since even if the facing distance is set to be smaller, the detection accuracy decreases in a state in which the front section 52 of the transmission member 50 is separated from the reed 22 in the initial state, it is also necessary to reliably bring the front section 52 of the transmission member 50 into close contact with the reed 22 in the initial state.

However, there are a risk of a relative position between the optical sensor S2 and the rotation shaft 51 deviating due to dimensional tolerances of components and error during assembling and a risk of the front section 52 of the transmission member 50 being separated from the reed 22 due to the change in the elastic force applied to the transmission member 50 from the elastic part 43 when components are assembled.

On the other hand, in the present embodiment, since the substrate 70 to which the optical sensor S2 is fixed and the rotation shaft 51 of the transmission member 50 are supported by the support member 60, the relative position between the optical sensor S2 and the rotation shaft 51 of the transmission member 50 can be determined by one component. Thereby, compared to when the transmission member 50 and the substrate 70 are supported by separate components, it is possible to minimize the deviation of the relative position between the optical sensor S2 and the rotation shaft 51 due to dimensional tolerances and error during assembling. Therefore, it is possible to accurately detect the amount of rotation of the transmission member 50.

In addition, since the elastic member 40 that applies an elastic force to the front section 52 of the transmission member 50 toward the reed 22 and the sealing member 31 provided between the inner circumferential surface of the blow port 20 and the outer circumferential surface of the cylindrical member 30 are formed separately, it is possible to minimize deformation of the elastic member 40 (the elastic part 43) when the blow port 20 is assembled to the cylindrical member 30. In addition, as described above, even if the blow port 20 is detachable from the cylindrical member 30, it is possible to minimize deformation of the elastic member 40 during the detachment.

Thereby, since an elastic force that is applied from the elastic part 43 to the transmission member 50 can be prevented from changing due to deformation of the elastic member 40, it is possible to prevent the front section 52 of the transmission member 50 from being separated from the reed 22 and a distance between the optical sensor S2 and the flat surface 53*a* of the transmission member 50 in the initial state from changing. Therefore, it is possible to accurately detect the amount of rotation of the transmission member 50.

Here, since an elastic force is applied by the elastic part 43 to the transmission member 50 toward the reed 22, if the blow port 20 is removed from the cylindrical member 30, the front section 52 of the transmission member 50 rotates downward. Along with this rotation, the rear section 53 of the transmission member 50 rotates upward, and thus there is a risk of the flat surface 53*a* coming in contact with the optical sensor S2 and the optical sensor S2 being damaged.

On the other hand, in the present embodiment, a restriction member 80 (for example, formed using rubber or felt) is fixed to the bottom surface of the substrate 70, and the restriction member 80 is disposed to face the rear section 53 of the transmission member 50 in the initial state. That is, the restriction member 80 is disposed on a displacement trajectory of the transmission member 50 when the blow port 20 is removed from the cylindrical member 30.

In addition, a distance between the restriction member 80 and the rear section 53 of the transmission member 50 which face each other in the initial state is set to be smaller than a distance between the optical sensor S2 and the flat surface 53*a* of the transmission member 50. Thereby, even if the blow port 20 is removed from the cylindrical member 30 and the transmission member 50 rotates, since the restriction member 80 functions as a stopper, it is possible to prevent the flat surface 53*a* of the transmission member 50 from coming in contact with the optical sensor S2. Therefore, it is possible to prevent the optical sensor S2 from being damaged.

Here, in the present embodiment, although the restriction member 80 and the transmission member 50 in the initial state are separated by a predetermined interval, the restriction member 80 and the transmission member 50 may be brought into contact with each other in the initial state. Thereby, the restriction member 80 can also have a function of determining a distance between the optical sensor S2 and the flat surface 53*a* which face each other (determining the position of the transmission member 50 in the initial state) in the initial state.

In this manner, in order to detect the amount of displacement of the reed 22 due to the rotation of the transmission member 50, it is necessary to bring the front section 52 of the transmission member 50 into contact with the reed 22 in the initial state and dispose the flat surface 53*a* of the rear section 53 so that it faces the optical sensor S2. Therefore, for example, when vertical height positions of the inner surface of the reed 22 and the optical sensor S2 are different as in the present embodiment, it is necessary to bend a part of the transmission member 50 such that it corresponds to the disposition of the reed 22 and the optical sensor S2.

When the transmission member 50 is bent, there is a risk of the front end and the rear end of the transmission member 50 deviating in the left to right direction (vertical direction on the paper) with respect to the rotation shaft 51. In this case, since a relatively large contact area is secured in the left to right direction on the inner surface of the reed 22, such a positional deviation of the transmission member 50 is relatively acceptable. On the other hand, since it is necessary to dispose the flat surface 53*a* on the optical axis of the optical sensor S2 so that it faces the optical sensor S2, it is difficult to allow such a positional deviation in the left to right direction described above.

In addition, when the flat surface 53*a* is tilted by bending the transmission member 50, there is a risk of the flat surface 53*a* being inclined in a direction perpendicular to the optical axis of the optical sensor S2. When such an inclination occurs, there is a risk of light reflected from the flat surface 53*a* not being received by the light-receiving section of the optical sensor S2. Therefore, for example, when bending is performed on the side of the rear section 53 of the transmission member 50, it is difficult to accurately detect the amount of rotation of the transmission member 50.

On the other hand, in the present embodiment, the transmission member 50 comes into contact with the inner surface of the reed 22 when the rear section 53 extends linearly from the flat surface 53*a* to the rotation shaft 51 and the front section 52 that protrudes from the elastic part 43 is bent downward. That is, since the transmission member 50 is bent on the front section 52 such that it corresponds to the disposition of the reed 22 and the optical sensor S2, the accuracy of the relative position between the optical sensor S2 and the flat surface 53*a* in the left to right direction can be improved, and it is possible to prevent the flat surface 53*a* from being inclined in a direction perpendicular to the optical axis of the optical sensor S2. Therefore, it is possible to accurately detect the amount of rotation of the transmission member 50 by the optical sensor S2.

When the performer plays the electronic wind instrument 1, water flows from the opening part 21 of the blow port 20 together with exhaled air, and the water is discharged to the outside through the above drain pipe 45 (refer to FIG. 2). However, there is a risk of water flowing from the opening part 21 directly flowing into the introduction pipe 44.

On the other hand, in the present embodiment, the front end part of the introduction pipe 44 that protrudes from the front surface of the cylindrical part 41 of the elastic member 40 is bent in the radial direction of the cylindrical part 41, and the opening on the front end side of the introduction pipe 44 is directed away from the opening part 21 of the blow port 20. Thereby, it is possible to prevent water flowing from the opening part 21 from flowing into the introduction pipe 44.

In this case, for example, a protruding part on the front end side of the introduction pipe 44 can be formed using a cylindrical component (for example, formed using a resin material) that is a component separate from the elastic member 40. However, in such a configuration, there is a risk of the elastic member 40 being deformed when such a cylindrical component is fitted into the elastic member 40 and an elastic force applied from the elastic part 43 to the transmission member 50 changing. In addition, there is a risk of the cylindrical component falling off of the elastic member 40 during playing.

On the other hand, in the present embodiment, since the elastic member 40 and the introduction pipe 44 are integrally formed, it is not necessary to fit the protruding part on the front end side of the introduction pipe 44 into the elastic member 40. Therefore, it is possible to prevent the elastic force applied from the elastic part 43 to the transmission member 50 from changing, and thus it is possible to accurately detect the amount of rotation of the transmission member 50. In addition, since it is possible to prevent the protruding part on the front end side of the introduction pipe 44 from falling off during playing, it is possible to secure safety during playing. In addition, since the drain pipe 45 (refer to FIG. 2) is also formed integrally with the elastic member 40 in addition to the introduction pipe 44, it is possible to reduce the number of components.

As described above, since it is necessary to bring the front section 52 into contact with the reed 22, the transmission member 50 is provided at a position eccentric to the side below the center of the elastic member 40 in the vertical direction. Since it is necessary to provide the introduction pipe 44 and the drain pipe 45 at a position avoiding the displacement region of the transmission member 50, as in the present embodiment, it is preferable to provide the introduction pipe 44 and the drain pipe 45 at a position eccentric to the side above the center of the elastic member 40 in the vertical direction. Thereby, it is possible to efficiently use the space inside the cylindrical member 30.

In addition, since the optical sensor S2 disposed to face the transmission member 50 is fixed to the bottom surface side of the substrate 70 and the breath sensor S1 to which the introduction pipe 44 is connected is fixed to the upper surface side of the substrate 70, the bottom surface side of the substrate 70 can be used as a region in which the transmission member 50 and the optical sensor S2 are disposed and the upper surface side can be used as a region in which the introduction pipe 44 and the breath sensor S1 are disposed. Thereby, for example, compared to when the breath sensor S1 is provided on the bottom surface of the substrate 70, it is possible to simplify the path of the introduction pipe 44.

Here, when the performer plays the electronic wind instrument 1, since the bottom surface of the instrument main body 2 is often directed toward the performer or the floor, external light (for example, light of lighting) is likely to be emitted from the upper surface side of the instrument main body 2. In this case, in the present embodiment, since the amount of rotation of the transmission member 50 is detected by the optical sensor S2, if external light reaches the light-receiving section of the optical sensor S2, there is a risk of the optical sensor S2 performing erroneous detection.

On the other hand, in the present embodiment, since the optical sensor S2 is fixed to the bottom surface of the substrate 70, the substrate 70 is provided between the upper inner surface of the instrument main body 2 and the optical sensor S2. Since the substrate 70 is formed as a hard rigid substrate (for example, a substance formed using a ceramic, a resin, or the like and having a light blocking property), the substrate 70 can block external light from the upper surface side of the instrument main body 2.

Thereby, since it is possible to prevent external light from reaching the light-receiving section of the optical sensor S2, it is possible to prevent the optical sensor S2 from erroneously detecting external light. In addition, when the substrate 70 blocks external light, it is not necessary to separately provide a member for blocking light, and thus it is possible to reduce the number of components.

In addition, since the breath sensor S1 is fixed to the side opposite to the optical sensor S2 with the substrate 70 therebetween, the breath sensor S1 can block external light from the upper surface side of the instrument main body 2. Therefore, it is possible to prevent the optical sensor S2 from erroneously detecting external light. Inn addition, since the breath sensor S1 can also have a function for blocking external light, it is possible to reduce the number of components.

In addition, since the optical sensor S2 is fixed to the substrate 70 in an orientation in which the light-receiving section faces the bottom surface side of the instrument main body 2, even if external light is emitted from the upper surface side of the instrument main body 2, it is possible to prevent the external light from being received by the light-receiving section of the optical sensor S2. Therefore, it is possible to prevent the optical sensor S2 from erroneously detecting external light.

Here, in order to easily assemble the transmission member 50, the upper side of the accommodation space is open. That is, the rear section 53 of the transmission member 50 is surrounded by the pair of wall parts 62*b* (refer to FIG. 2) that are disposed to face each other in the left to right direction, the wall part 62*b* provided on the extension tip side of the rear section 53, and the bottom surface of the support part 62, but the upper surface of the rear section 53 of the transmission member 50 positioned on the front side of the substrate 70 is exposed.

Therefore, for example, there is a risk of external light that has passed through the blow port 20 and the cylindrical member 30 or external light that has entered through a gap between the instrument main body 2 and the cylindrical member 30 being reflected at the upper surface of the rear section 53 and the bottom surface of the accommodation space and the optical sensor S2 performing erroneous detection.

On the other hand, in the present embodiment, the substrate 70 that covers the optical sensor S2 from the upper surface side protrudes forward from the optical sensor S2 and a part of the accommodation space is covered with the substrate 70 from above. Thereby, on the front side of the optical sensor S2, since a part of the upper surface of the rear section 53 and a part of the bottom surface of the accommodation space can be covered with the substrate 70 from above, it is possible to prevent the optical sensor S2 from erroneously detecting external light reflected at the upper surface of the rear section 53 and the bottom surface of the accommodation space.

In addition, since the restriction member 80 is disposed to face the upper surface of the rear section 53 on the front side of the flat surface 53*a*, the restriction member 80 can block external light emitted from a gap between the front end of the substrate 70 and the rear section 53 toward the flat surface 53*a*. Therefore, it is possible to prevent the optical sensor S2 from erroneously detecting external light reflected at the rear section 53. In addition, since the restriction member 80 can also have a function for blocking external light, it is possible to reduce the number of components.

In addition, since the substrate 70 protrudes forward from a boundary between the instrument main body 2 and the cylindrical member 30, it is possible to block external light that has entered through a gap between the instrument main body 2 and the cylindrical member 30 by the substrate 70 and prevent external light from being emitted to the upper surface of the rear section 53 and the bottom surface of the accommodation space. Thereby, it is possible to prevent the optical sensor S2 from erroneously detecting external light that has entered through a gap between the instrument main body 2 and the cylindrical member 30.

In this manner, external light is easily emitted from the upper surface side of the instrument main body 2, but may be emitted from the bottom surface side and the left and right side surfaces of the instrument main body 2. On the other hand, in the present embodiment, since the optical sensor S2 is fixed to the bottom surface of the substrate 70 and the substrate 70 is supported by the support part 62 of the support member 60 from below, the support part 62 of the support member 60 is provided between the optical sensor S2 and the lower inner surface of the instrument main body 2. Since the support member 60 is formed using an opaque material (for example, a black resin material), the support member 60 can block external light from the bottom surface side of the instrument main body 2. Thereby, it is possible to prevent the optical sensor S2 from erroneously detecting such external light.

In addition, when the substrate 70 is supported by the wall part 62*b* of the support part 62, a gap between the bottom surface of the substrate 70 and the bottom surface of the accommodation space is connected by the wall part 62*b*. That is, the flat surface 53*a* of the rear section 53 and the optical sensor S2 are covered with the substrate 70 and the support member 60 from both the upper surface side and the bottom surface side, and also surrounded by the wall part 62*b* from both the left and right sides and the rear side (three sides).

Thereby, since the wall part 62*b* can block external light that has passed through the instrument main body 2 from the both left and right sides and the rear side (or external light reflected by respective parts inside the instrument main body 2), it is possible to prevent the optical sensor S2 from erroneously detecting external light. In this manner, if it is possible to prevent the optical sensor S2 from erroneously detecting external light, it is possible to accurately detect the amount of rotation of the transmission member 50.

In addition, since the substrate 70 to which the optical sensor S2 is fixed and the rotation shaft 51 of the transmission member 50 are supported by the support member 60, as described above, it is possible to minimize the deviation of the relative position between the optical sensor S2 and the rotation shaft 51 due to dimensional tolerances and error during assembling, and the support member 60 can also have a function for blocking external light. Therefore, it is possible to reduce the number of components.

In addition, since the transmission member 50 and the substrate 70 (supporting the breath sensor S1 and the optical sensor S2) are supported by the support member 60, and the blow port 20 and the elastic member 40 are fixed to the support member 60 via the cylindrical member 30, if a state in which the instrument main body 2 and the support member 60 are fixed is released, it is possible to remove the blow port unit 10 from the instrument main body 2 in a unitized state (refer to (b) of FIG. 1).

Thereby, when the substrate 70 is connected to an inspection device (not shown), the operation of the blow port unit 10 can be checked without assembling the entire electronic wind instrument 1. In addition, it is possible to easily assemble the blow port unit 10 to the instrument main body 2, and also, if the blow port unit 10 is damaged, it is possible to easily perform repair by performing replacement for each unit.

While the present invention has been described above based on the above embodiments, the present invention is not limited to the embodiments, and it can be easily speculated that various deformation improvements can be made without departing from the spirit and scope of the present invention. For example, the shapes, sizes, and materials of respective parts of the electronic wind instrument 1 may be appropriately changed. In addition, the electronic wind instrument 1 is not limited to an electronic musical instrument that simulates a saxophone, and may be an electronic musical instrument that simulates a wind instrument other than the saxophone.

While a case in which the breath sensor S1 is fixed to the upper surface of the substrate 70 and the optical sensor S2 is fixed to the bottom surface of the substrate 70, that is, a region in which the breath sensor S1 and the introduction pipe 44 are disposed is formed on the upper surface side of the substrate 70, and a region in which the optical sensor S2 and the transmission member 50 are disposed is formed on the bottom surface side of the substrate 70 has been described in the above embodiment, the present invention is not necessarily limited thereto. For example, the breath sensor S1 may be fixed to the bottom surface of the substrate 70, the optical sensor S2 may be fixed to the upper surface of the substrate 70, and the disposition of the introduction pipe 44 and the transmission member 50 may be appropriately set according to the disposition of the breath sensor S1 and the optical sensor S2.

While a case in which the optical sensor S2 that includes a light emitting section and a light-receiving section in an integral manner detects the amount of rotation of the transmission member 50 has been described in the above embodiment, the present invention is not necessarily limited thereto, and a sensor for measuring a distance to the transmission member 50 may be appropriately used. Therefore, for example, an optical sensor including a light emitting section and a light-receiving section that are separate components may be used, and a non-contact type sensor that detects a distance to the flat surface 53*a* of the rear section 53 of the transmission member 50 according to the change in the magnetic field or the change in the capacitance may be used.

While a case in which a length of the blow port 20 fitted into the cylindrical member 30 is set to be longer than the outer diameter of the cylindrical member 30 has been described in the above embodiment, the present invention is not necessarily limited thereto. For example, a configuration in which a length of the blow port 20 fitted into the cylindrical member 30 is set to be equal or smaller than the outer diameter of the cylindrical member 30 may be used.

While a case in which the optical sensor S2 is provided on the side opposite to the flat surface 53*a* in the rotation direction due to displacement of the reed 22 has been described in the above embodiment, the present invention is not necessarily limited thereto. For example, the optical sensor S2 may be provided on the rotation direction side of the flat surface 53*a* due to displacement of the reed 22.

While a case in which the sealing member 31 is formed separately from the elastic member 40 has been described in the above embodiment, the present invention is not necessarily limited thereto. For example, the elastic member 40 may be fitted and fixed to the outer circumferential surface of the cylindrical member 30, and the elastic member 40 may also have a function as a sealing member.

While a case in which the elastic member 40 is fixed to the inner circumferential surface of the cylindrical member 30 using a region between the pair of sealing members 31 has been described in the above embodiment, the present invention is not necessarily limited thereto. For example, a configuration in which the elastic member 40 is fixed to the cylindrical member 30 on the axial end side of the sealing member 31.

While a case in which the pair of sealing members 31 are provided in the axial direction of the cylindrical member 30 has been described in the above embodiment, the present invention is not necessarily limited thereto. For example, a configuration in which one or three or more sealing members 31 may be provided on the outer circumferential surface of the cylindrical member 30 may be used.

While a case in which the introduction pipe 44 and the drain pipe 45 are integrally formed with the elastic member 40 has been described in the above embodiment, the present invention is not necessarily limited thereto. For example, the introduction pipe 44 and the drain pipe 45 are formed separately from the elastic member 40, and pipes (for example, formed using a resin or a metal material) corresponding to the introduction pipe 44 and the drain pipe 45 may be fitted into the elastic member 40.

While a case in which the front section 52 of the transmission member 50 is formed by bending has been described in the above embodiment, the present invention is not necessarily limited thereto. For example, a configuration in which the entire transmission member 50 is linearly formed may be used, and a configuration in which the side of the rear section 53 is formed by bending may be used. That is, the shape of the transmission member 50 may be appropriately determined according to the disposition of the optical sensor S2 (the substrate 70) and the inner surface of the reed 22.

While a case in which the transmission member 50 and the substrate 70 are supported by the support member 60 has been described in the above embodiment, the present invention is not necessarily limited thereto. For example, the transmission member 50 and the substrate 70 may be supported by separate members.

While a case in which the restriction member 80 is disposed to face the rear section 53 on the front side of the flat surface 53*a* of the rear section 53 of the transmission member 50 has been described in the above embodiment, the present invention is not necessarily limited thereto, and disposition of the restriction member 80 can be appropriately set as long as it is on the rotation trajectory of the transmission member 50. In addition, a configuration in which the restriction member 80 is omitted may be used.

While a case in which the optical sensor S2 is surrounded by the bottom surface of the accommodation space, the wall part 62*b*, and the bottom surface of the substrate 70 has been described in the above embodiment, the present invention is not necessarily limited thereto. For example, a configuration in which the wall part 62*b* is omitted may be used, a configuration in which the bottom surface of the accommodation space (a part of the support part 62) is omitted may be used, and a configuration in which the substrate 70 is fixed to the upper inner surface of the instrument main body 2 may be used.

That is, as long as at least a component (first light-blocking member) that corresponds to the substrate 70 is provided between the upper inner surface of the instrument main body 2 and the optical sensor S2, the present invention is not limited to the configuration of the above embodiment. Therefore, when the optical sensor S2 is fixed to a member different from the substrate 70, a component that blocks light may be separately provided between the optical sensor S2 and the upper inner surface of the instrument main body 2.

In (b) of FIG. 4, the output of the optical sensor S2 on the vertical axis is represented by the "OUTPUT VOLTAGE". Actually, an output of an optical sensor (single body) is originally represented by "CURRENT", and then, the "CURRENT" is represented as the "VOLTAGE" so as to facilitate subsequent management of signal processing. In the following description, the output characteristics of the optical sensor (each circuit configuration, and each output current or output voltage) will be further described with reference to FIG. 5 to FIG. 7.

Figure 5:
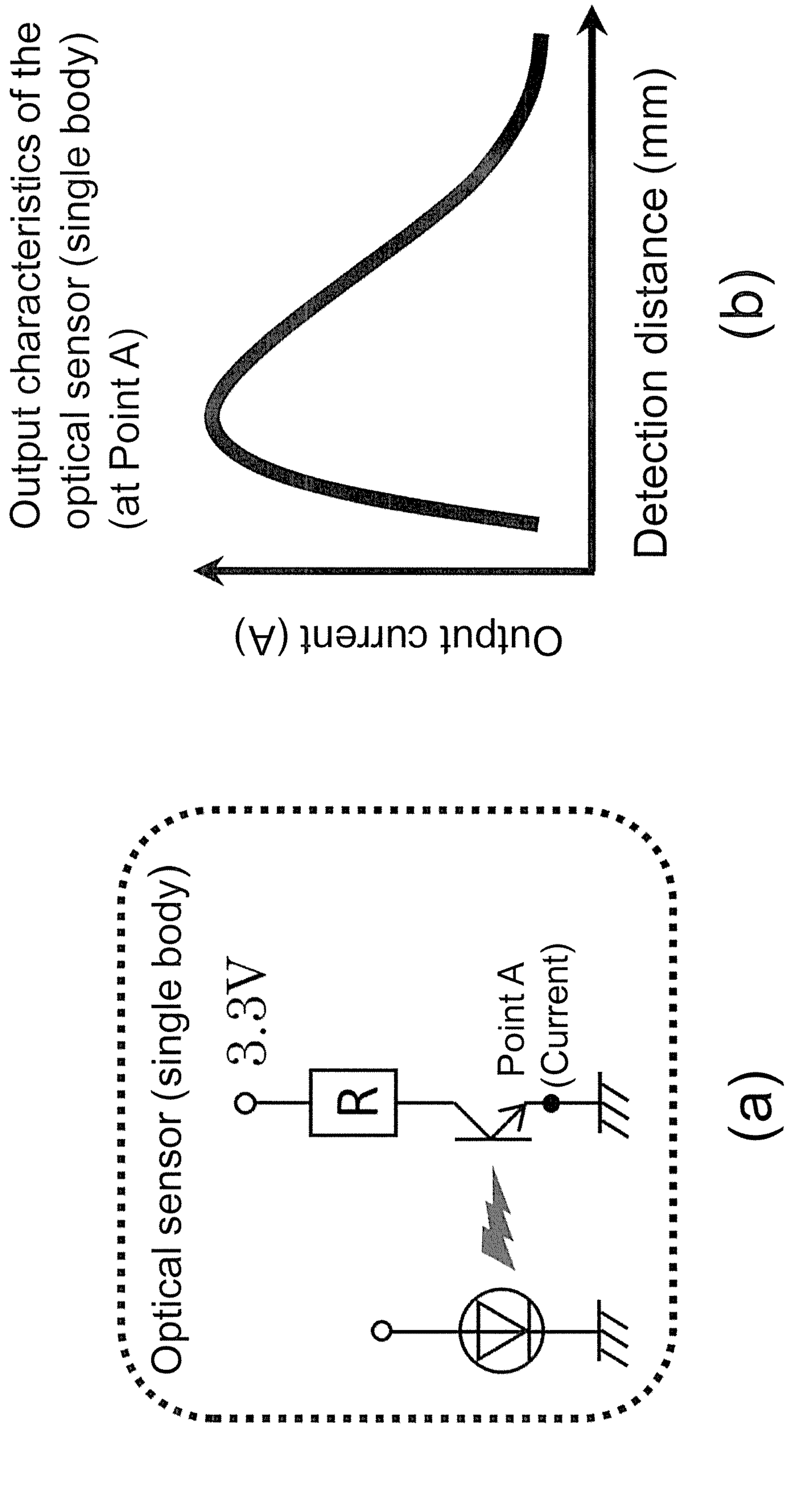
In FIG. 5, (a) shows an optical sensor (single body) having an output portion configured by a phototransistor, and the output (at Point A) is represented by "Current"; and (b) shows the output characteristics of the optical sensor (single body) at Point A, where the horizontal axis represents "Detection distance (mm)" and the vertical axis represents "Output current (A)".

In FIG. 5, (a) shows an optical sensor (single body) having an output portion configured by a phototransistor, and the output (at Point A) is represented by "Current"; and (b) shows the output characteristics of the optical sensor (single body) at Point A, where the horizontal axis represents "Detection distance (mm)" and the vertical axis represents "Output current (A)".

Please referring to (a) and (b) of FIG. 5, the output portion of the optical sensor (single body) is configured by a phototransistor. When the light emitted by the photodiode is incident into the phototransistor, due to the photoelectric effect, the output of the phototransistor (at Point A) is "Current" in principle.

Moreover, a circuit can be configured in the output portion of the optical sensor to represent the output as a "Voltage", so as to facilitate the subsequent management of signal processing. Depending on the circuit configuration, the curve shape of the output voltage can be the same as the curve shape of Point A (Current), or the curve shape of the output voltage can be upside down from the curve shape of Point A (Current).

Figure 6:
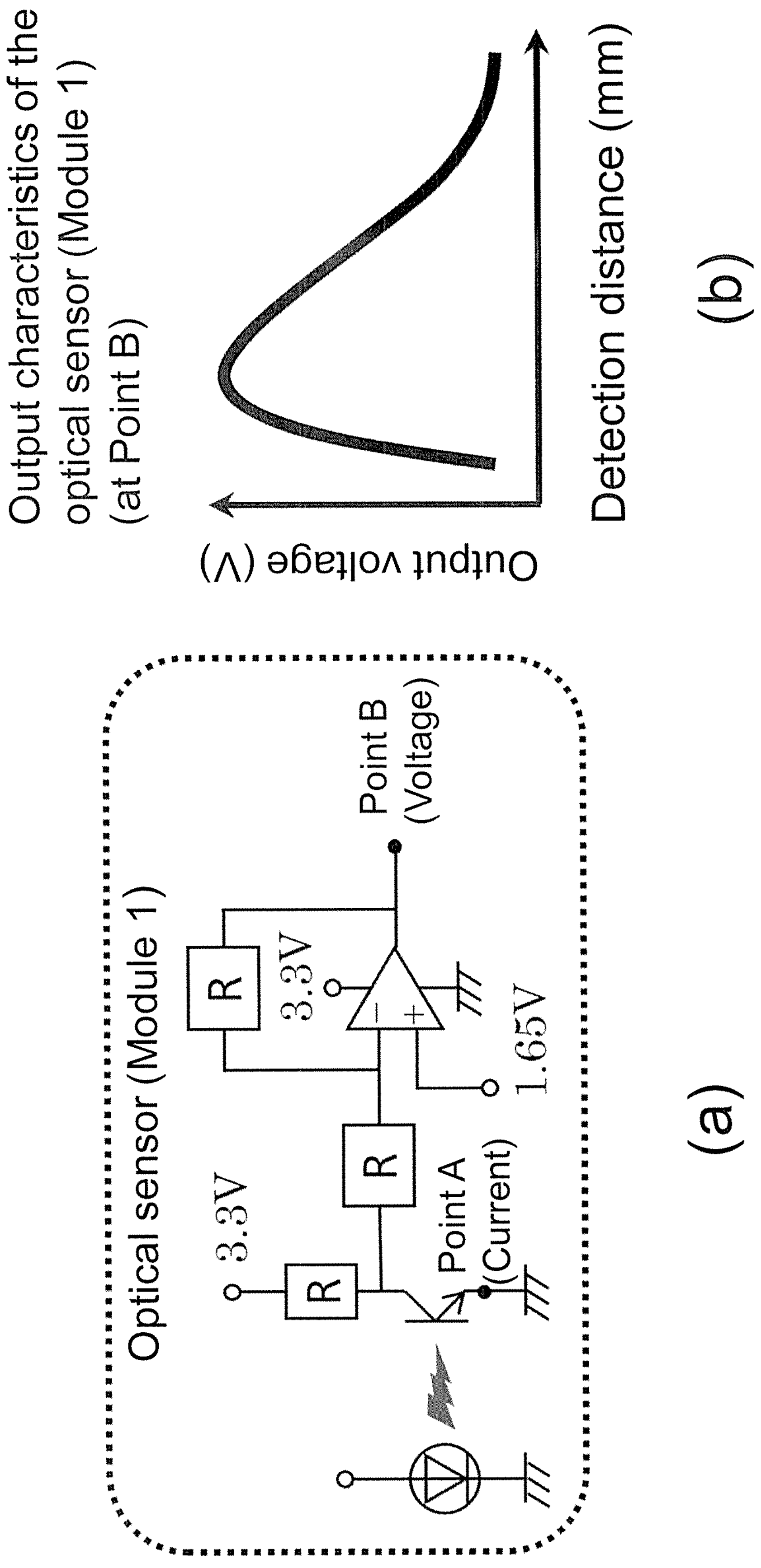
In FIG. 6, (a) shows an optical sensor (Module 1) having an output portion configured by a phototransistor and a circuit, the output (at Point A) is represented by "Current", and the output (at Point B) is represented by "Voltage"; and (b) shows the output characteristics of the optical sensor (Module 1) at Point B, where the horizontal axis represents "Detection distance (mm)" and the vertical axis represents "Output voltage (V)".

In FIG. 6, (a) shows an optical sensor (Module 1) having an output portion configured by a phototransistor and a circuit, the output (at Point A) is represented by "Current", and the output (at Point B) is represented by "Voltage"; and (b) shows the output characteristics of the optical sensor (Module 1) at Point B, where the horizontal axis represents "Detection distance (mm)" and the vertical axis represents "Output voltage (V)".

When a circuit configuration such as the Optical sensor (Module 1) is configured as shown in (a) of FIG. 6, the curve shape of the output voltage at Point B is the same as the curve shape of Point A (Current).

Figure 7:
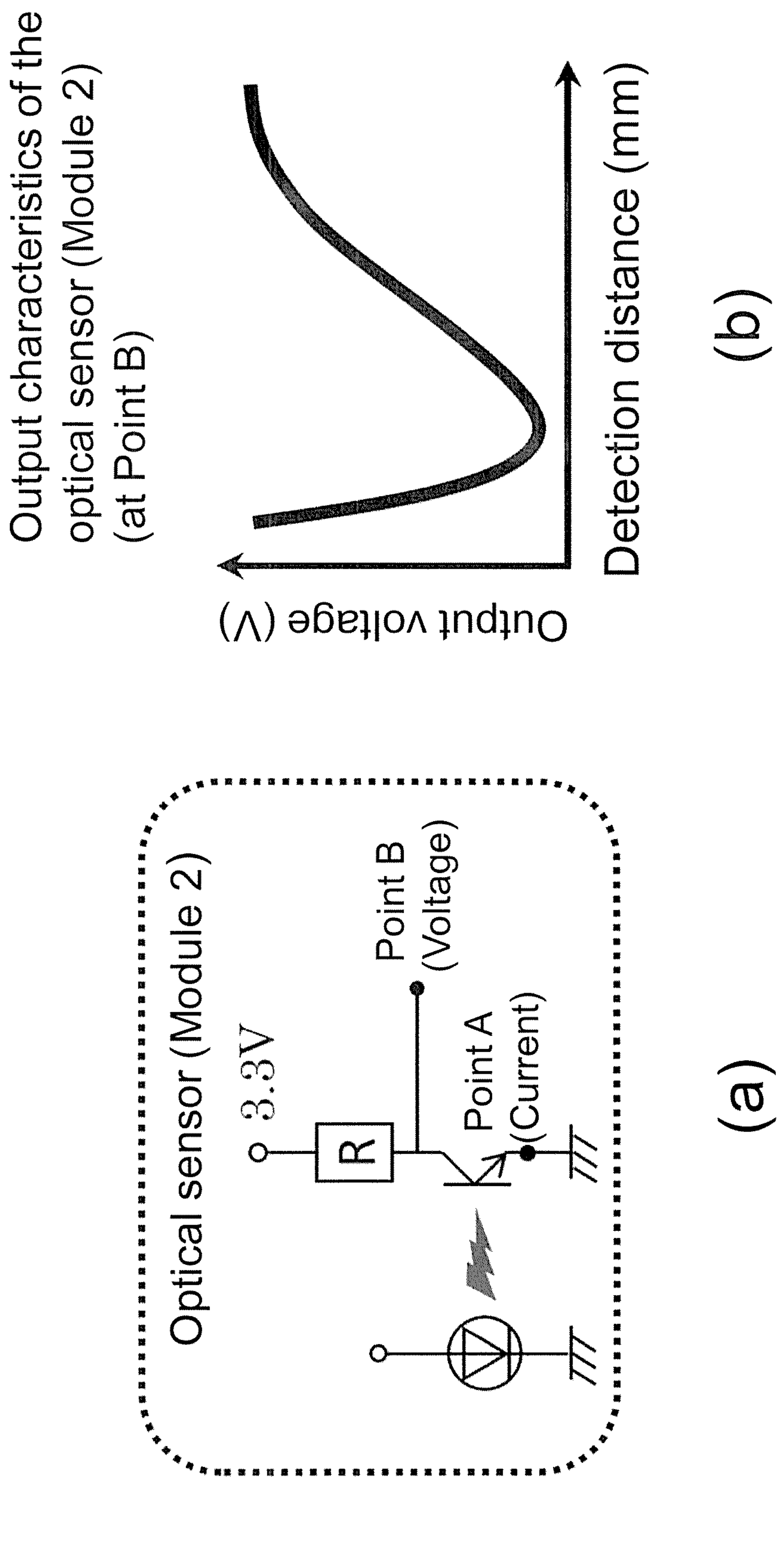
In FIG. 7, (a) shows an optical sensor (Module 2) having an output portion configured by a phototransistor and a circuit, the output (at Point A) is represented by "Current", and the output (at Point B) is represented by "Voltage"; and (b) shows the output characteristics of the optical sensor (Module 2) at Point B, where the horizontal axis represents "Detection distance (mm)" and the vertical axis represents "Output voltage (V)".

In FIG. 7, (a) shows an optical sensor (Module 2) having an output portion configured by a phototransistor and a circuit, the output (at Point A) is represented by "Current", and the output (at Point B) is represented by "Voltage"; and (b) shows the output characteristics of the optical sensor (Module 2) at Point B, where the horizontal axis represents "Detection distance (mm)" and the vertical axis represents "Output voltage (V)".

When a circuit configuration such as the Optical sensor (Module 2) is configured as shown in (a) of FIG. 7, the curve shape of the output voltage at Point B is upside down from the curve shape of Point A (Current). As described above, FIG. 6 (Module 1) and FIG. 7 (Module 2) show two different output circuits of the Optical sensor. It can be noticed that, the graph showing output characteristics of the optical sensor shown in (b) of FIG. 4 is obtained by utilizing the Optical sensor (Module 1) as shown in FIG. 6. Moreover, in the following displacement amount detecting apparatus as shown in FIG. 8, the Optical sensor (Module 2) as shown in FIG. 7 is utilized.

Figure 8:
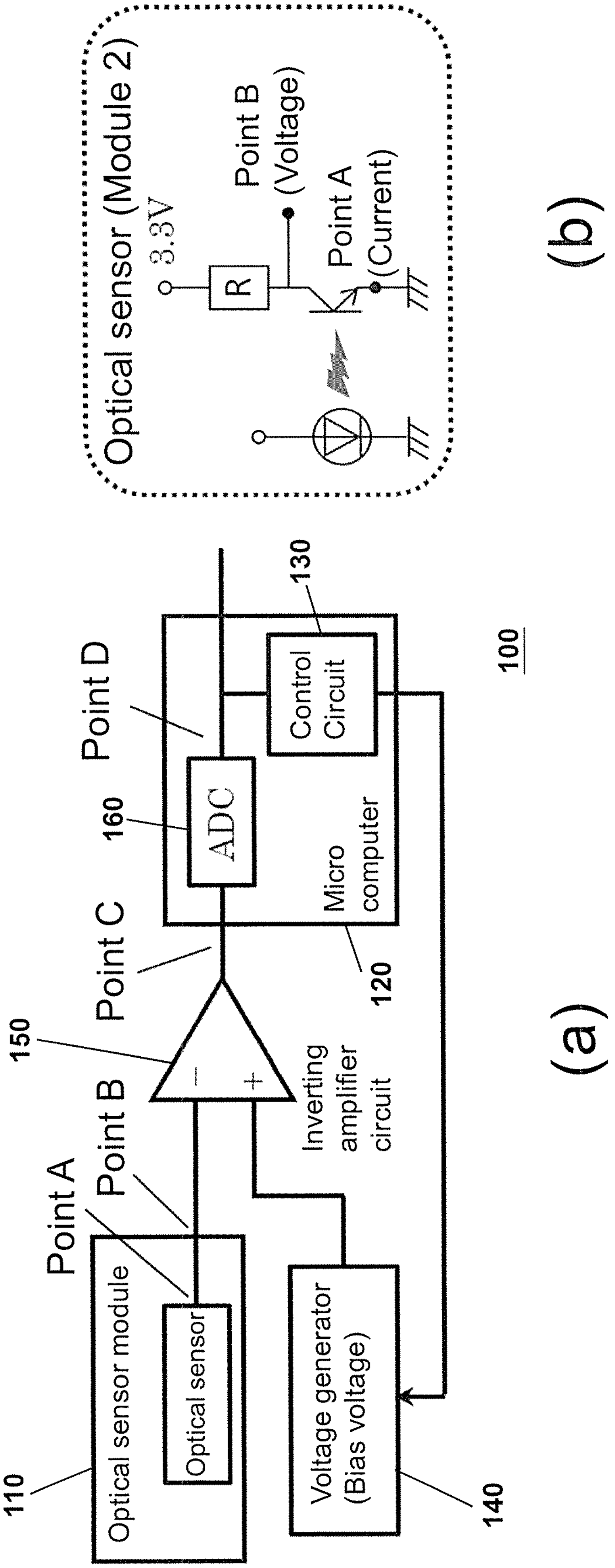
In FIG. 8, (a) shows a block diagram of a displacement amount detecting apparatus in the electronic wind instrument, and (b) shows the circuit configuration of the optical sensor (Module 2) that can be utilized in the displacement amount detecting apparatus as shown in (a).

In FIG. 8, (a) shows a block diagram of a displacement amount detecting apparatus in the electronic wind instrument, and (b) shows the circuit configuration of the optical sensor (Module 2) that can be utilized in the displacement amount detecting apparatus as shown in (a).

Please referring to (a) of FIG. 4 and (a) of FIG. 8, the displacement amount detecting apparatus 100 includes: a transmission member 50, a sensor 110, a calculation device 120 and a correction device 130. The transmission member 50 is configured to transmit a displacement on one end (such as front section 52 shown in (a) of FIG. 4) side thereof to a displacement on the other end (such as rear section 53 shown in (a) of FIG. 4) side thereof.

The sensor 110 (such as the optical sensor S2 in (a) of FIG. 4) is disposed to face the other end side of the transmission member 50, and is configured to output a value according to a distance between the sensor 110 and the other end side (such as the rear section 53 in (a) of FIG. 4) of the transmission member 50.

The calculation device 120 is configured to calculate a value for indicating the distance based on the value output by the sensor 110 and a reference value ("Bias voltage" shown in (a) of FIG. 8). The calculation device 120 can be a microcomputer.

The correction device 130 is configured to correct the reference value ("Bias voltage" shown in (a) of FIG. 8). The correction device 130 can be a control circuit.

When the one end (such as front section 52 shown in (a) of FIG. 4) side s displaced in a first direction (such as the arrow U direction shown in (a) of FIG. 4), the other end (such as rear section 53 shown in (a) of FIG. 4) side is displaced in a second direction (such as the arrow D direction shown in (a) of FIG. 4) opposite to the first direction and away from the sensor 110 (such as the optical sensor S2 in (a) of FIG. 4). The correction device 130 is configured to correct the reference value ("Bias voltage" shown in (a) of FIG. 8) based on the value for indicating the distance calculated by the calculation device 120.

Please referring to (a) of FIG. 8, the displacement amount detecting apparatus 100 further includes a voltage generator 140 for providing the bias voltage having the reference value. And as described above, the bias voltage having the reference value can be corrected by the correction device 130.

The displacement amount detecting apparatus 100 further includes an inverting amplifier circuit 150 and an analog-to-digital converter (ADC) 160. The inverting amplifier circuit 150 has a first input port (−) connected with the sensor 110, a second input port (+) connected with the voltage generator 140, and an output port connected with the ADC 160. And, the ADC 160 is configured in the calculation device 120.

Please referring to (a) of FIG. 8, there are Point A, Point B, Point C and Point D. In the following description, from the point of views at Point A, Point B, Point C and Point D, the operation of the displacement amount detecting apparatus 100 is further described in detail.

Figure 9:
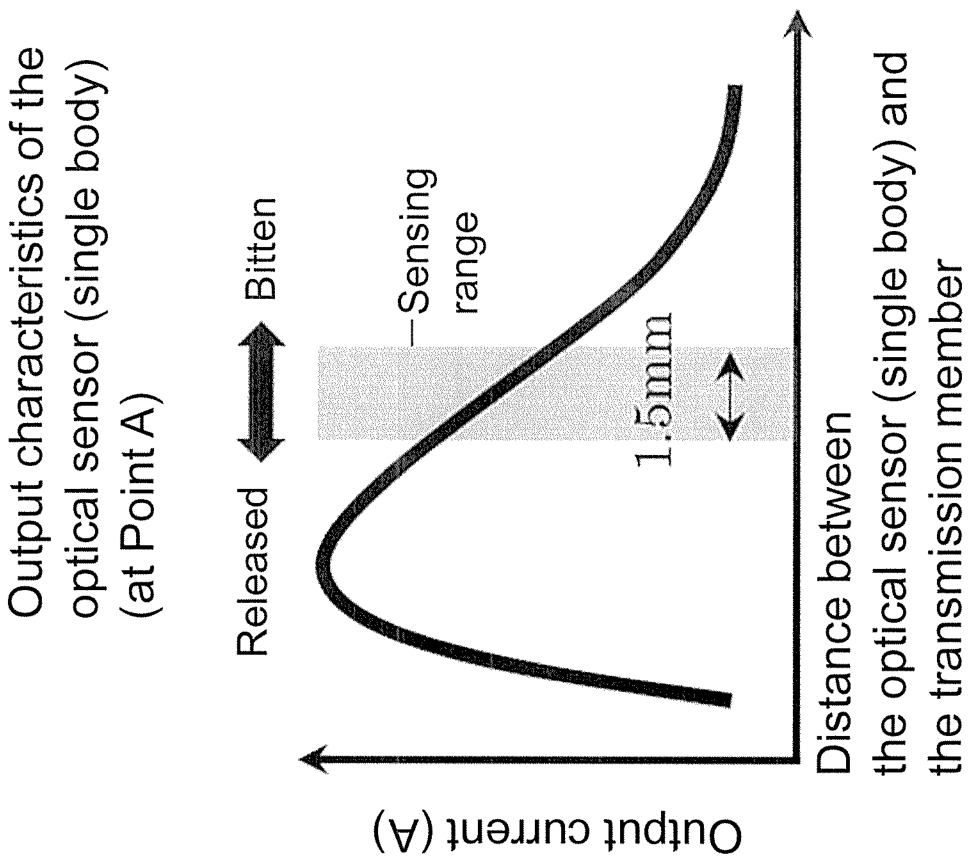
FIG. 9 shows an output characteristic of the optical sensor (single body) at Point A shown in (a) of FIG. 8, where the horizontal axis represents "Distance between the optical sensor (single body) and the transmission member (mm)", and the vertical axis represents "Output current (A)", and a "Sensing range" is illustrated in FIG. 9.

FIG. 9 shows an output characteristic of the optical sensor (single body) at Point A shown in (a) of FIG. 8, where the horizontal axis represents "Distance between the optical sensor (single body) and the transmission member (mm)", and the vertical axis represents "Output current (A)", and a "Sensing range" is illustrated in FIG. 9.

FIG. 9 shows a "Sensing range" for detecting the amount of rotation of the transmission member 50 according to the change in the distance between the optical sensor (such as the optical sensor S2 shown in (a) of FIG. 4) and the transmission member 50 (also see (a) of FIG. 4).

The "Sensing range" is determined according to the following standards (1) and (2), that is, (1) an area where the slope does not reverse, and (2) an area where the slope is large. Please referring to FIG. 9, as the distance increases, the slope becomes gentler, the current difference per unit distance becomes smaller, and the sensitivity as a sensor becomes dull. Therefore, the standard (2) is needed.

Please referring to FIG. 9, the horizontal position and length (1.5 mm) of the "Sensing range" itself as shown with shadow in FIG. 9 is first determined to be invariant to the optical sensor, but the actual distance between the optical sensor S2 and the flat surface 53*a* (determined by the degree of bitten to released, also see (a) of FIG. 4) deviates from the "Sensing range" that was first determined due to the reasons, such as, assembly error, error due to individual differences of the optical sensors, and manipulation of the user, and therefore, the output current of Point A also deviates.

Please referring to (b) of FIG. 8 again, the optical sensor (Module 2) is used. From the description of FIG. 7, it can be known that, the output characteristics (at Point A) of the optical sensor (single body) have a curve shape that is upside down from the curve shape of the output characteristics (at Point B) of the optical sensor (Module 2).

Figure 10:
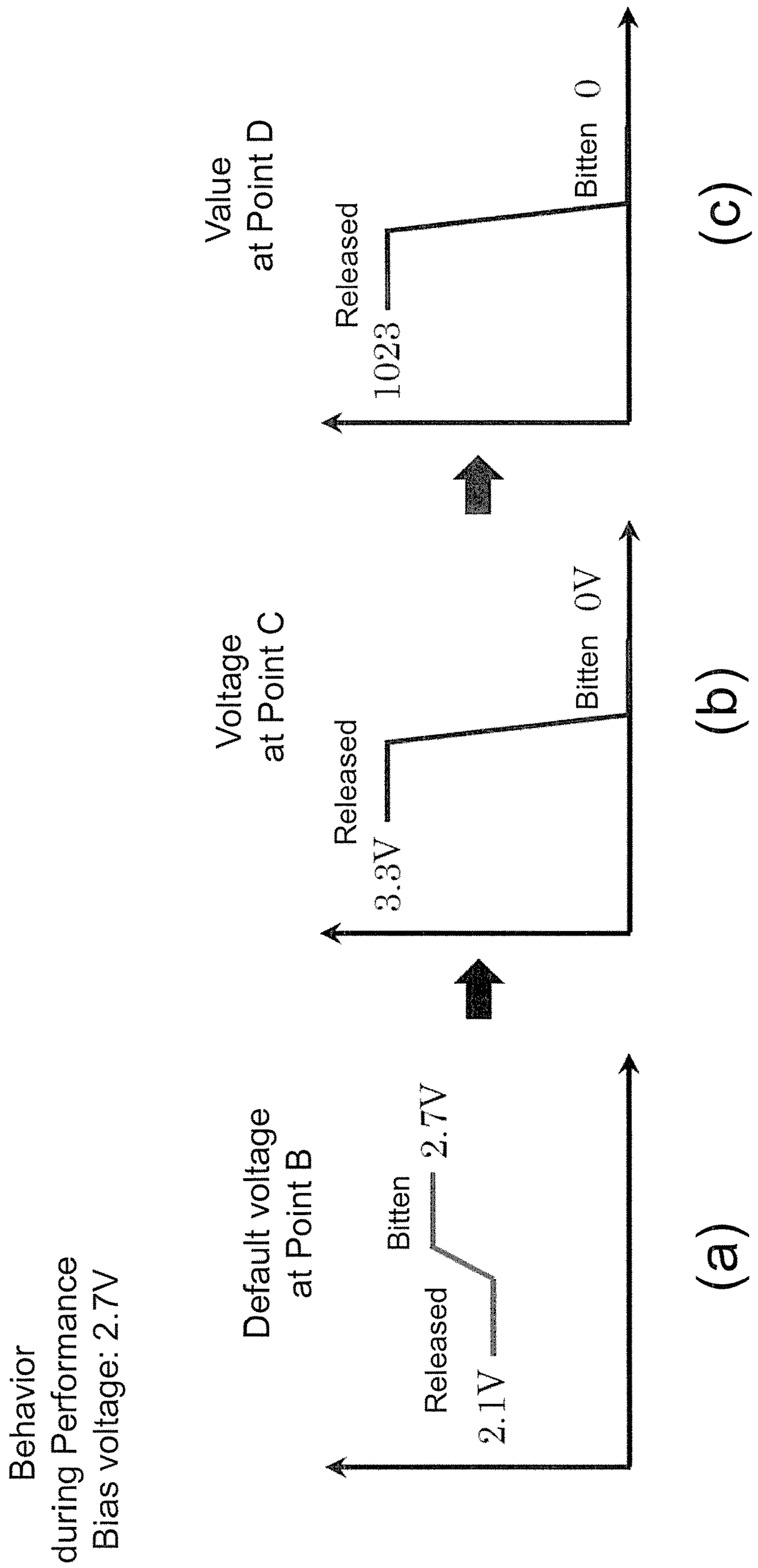
FIG. 10 shows a behavior during performance, in which (a) shows a default voltage at Point B shown in (a) of FIG. 8; (b) shows a voltage at Point C shown in (a) of FIG. 8; and (c) shows a value at Point D shown in (a) of FIG. 8.

FIG. 10 shows a behavior during performance, in which (a) shows a default voltage at Point B shown in (a) of FIG. 8; (b) shows a voltage at Point C shown in (a) of FIG. 8; and (c) shows a value at Point D shown in (a) of FIG. 8.

Please referring to (a) of FIG. 8 and FIG. 10, during the behavior of performance, a bias voltage is 2.7V.

As shown in (a) of FIG. 10, the default voltage at Point B is 2.7V when the reed is bitten by the performer, and the default voltage at Point B is 2.1V when the reed is released by the performer.

Please referring to (a) of FIG. 8 and (b) of FIG. 10, the voltage at Point C can be calculated by the following equation, $$\text{Voltage at Point } C = (\text{Bias voltage} - \text{Voltage at Point } B) \times 10.$$

As shown in (b) of FIG. 10, the upper limit is 3.3V. And, the amount exceeding 3.3V is cut, that means, the curve in the "Released" part shown in FIG. 9 is cut. Thus, as shown in (b) of FIG. 10, the voltage at Point C is 0V when the reed is bitten by the performer, and the voltage at Point C is 3.3V when the reed is released by the performer.

Please referring to (a) of FIG. 8 and (c) of FIG. 10, the value at Point D is 0 when the reed is bitten by the performer, and the value at Point D is 1023 when the reed is released by the performer.

The actual voltage at Point B may deviate from the default voltage. Even if the deviation happened, the bias voltage is adjusted so that it is converted to the voltage range at Point C. Thus, a calibration can be executed.

Therefore, at the time of executing the calibration, the bias voltage is adjusted so that the output value (at Point D) of the ADC 160 (see (a) of FIG. 8) becomes 100, when the reed is normally bitten by the performer".

The output value (at Point D) of the ADC 160 is not adjusted to 0. This is because that, the output values range from "100 to 0" is utilized for detection when the reed is bitten by the performer from "normally to strongly".

In brief, as shown in (a) of FIG. 8, the correction device 130 can correct the reference value (Bias voltage) based on the value for indicating the distance calculated by the calculation device 120. Therefore, a calibration can be executed, so as to correct the situation of "actual voltage at Point B deviated from the default voltage". Thus, the performer can easily correct the dimension error by using the displacement amount detecting apparatus 100.

Further, an embodiment of an electronic wind instrument 1 (see (a) of FIG. 4) having the displacement amount detecting apparatus 100 (see (a) of FIG. 8) is also provided. The electronic wind instrument 1 includes an instrument main body 2; a blow port 20 which is attached to one end of the instrument main body 1 and has a cavity therein; a reed 22 which is attached to the blow port 20 and is configured to be displaceable toward the cavity when bitten by a performer; and the displacement amount detecting apparatus 100.

The displacement amount detecting apparatus 100 includes: a transmission member 50, configured to transmit a displacement on one end (such as front section 52 shown in (a) of FIG. 4) side thereof to a displacement on the other end (such as rear section 53 shown in (a) of FIG. 4) side thereof, and the transmission member 50 is configured to be rotatable around a predetermined axis 51 (such as the rotation shaft 51 shown in (a) of FIG. 4) with displacement of the reed 22 when one end of the transmission member 50 is brought into contact with the reed 22.

The sensor 110 (such as the optical sensor S2 in (a) of FIG. 4) is disposed to face the other end side of the transmission member 50, and is configured to output a value according to a distance between the sensor 110 and the other end side of the transmission member 50, and the sensor 110 (S2) is disposed to face a detection unit (such as the flat surface 53*a* in (a) of FIG. 4) on the other end side of the transmission member 50 and measures a distance between the sensor 110 (S2) and the detection unit 53*a*. When the reed 22 is displaced due to being bitten by the performer, the detection unit 53*a* of the transmission member 50 rotates away from the sensor 110 (S2).

The calculation device 120 is configured to calculate a value for indicating the distance based on the value output by the sensor 110 and a reference value ("Bias voltage" shown in (a) of FIG. 8). The calculation device 120 can be a microcomputer.

The correction device 130 is configured to correct the reference value ("Bias voltage" shown in (a) of FIG. 8). The correction device 130 can be a control circuit.

When the one end (such as front section 52 shown in (a) of FIG. 4) side is displaced in a first direction (such as the arrow U direction shown in (a) of FIG. 4), the other end (such as rear section 53 shown in (a) of FIG. 4) side is displaced in a second direction (such as the arrow D direction shown in (a) of FIG. 4) opposite to the first direction and away from the sensor 110 (such as the optical sensor S2 in (a) of FIG. 4). The correction device 130 is configured to correct the reference value ("Bias voltage" shown in (a) of FIG. 8) based on the value for indicating the distance calculated by the calculation device 120.

The performer can easily correct the dimension error by using the displacement amount detecting apparatus 100 disposed in the electronic wind instrument 1. Moreover, the other components in the electronic wind instrument 1 equipped with the displacement amount detecting apparatus 100 are as same as described above, and thus, the same contents are omitted.

What is claimed is:

1. An electronic wind instrument, comprising:

an instrument main body;

a blow port which is attached to one end of the instrument main body and has a cavity therein;

a reed which is attached to the blow port and is configured to be displaceable toward the cavity when bitten by a performer; and a displacement amount detecting apparatus, wherein the displacement amount detecting apparatus comprises:

a transmission member, configured to transmit a displacement on one end side thereof to a displacement on the other end side thereof, and the transmission member being configured to be rotatable around a predetermined axis with displacement of the reed when one end of the transmission member is brought into contact with the reed;

a sensor, disposed to face the other end side of the transmission member, and configured to output a value according to a distance between the sensor and the other end side of the transmission member, and the sensor being disposed to face a detection unit on the other end side of the transmission member and measures a distance between the sensor and the detection unit, wherein when the reed is displaced due to being bitten by the performer, the detection unit of the transmission member rotates away from the sensor;

a calculation device, configured to calculate a value for indicating the distance based on the value output by the sensor and a reference value; and a correction device, configured to correct the reference value, wherein when the one end side is displaced in a first direction, the other end side s displaced in a second direction opposite to the first direction and away from the sensor, the correction device is configured to correct the reference value based on the value for indicating the distance calculated by the calculation device.

2. The electronic wind instrument according to claim 1, wherein the sensor has a characteristic that an output reaches a peak when a distance to the transmission member is a predetermined value, and wherein in an initial state before the reed is displaced, a distance between the detection unit and the sensor which face each other is set to be larger than the predetermined value.

3. The electronic wind instrument according to claim 2, wherein the transmission member includes:

a linear part that linearly extends toward the cavity from the detection unit in the initial state; and a bent part which is connected to one end side of the linear part and bent toward the reed, wherein the linear part is pivotally supported.

4. The electronic wind instrument according to claim 1, further comprising:

a substrate to which the sensor is fixed; and a support member which supports the substrate, wherein the transmission member is rotatably supported by the support member.

5. The electronic wind instrument according to claim 1, comprising:

an elastic member which is composed of a rubber-like elastic component that covers one end side of the transmission member and applies an elastic force to the transmission member toward the reed; and a sealing member which is composed of a rubber-like elastic component that is separate from the elastic member and seals between the instrument main body and the blow port at a part in which the blow port is attached to the instrument main body.

6. The electronic wind instrument according to claim 5, further comprising:

an introduction pipe with a tubular shape of which one end is provided in the cavity; and a breath sensor to which the other end of the introduction pipe is connected and which detects a pressure of exhaled air flowing into the cavity of the blow port, wherein the introduction pipe and the elastic member are integrally formed of a rubber-like elastic component.

7. The electronic wind instrument according to claim 6, comprising:

a substrate having one surface on which the sensor is provided, wherein the breath sensor is provided on the other surface on the side opposite to the one surface of the substrate, and wherein a region in which the sensor and the transmission member are disposed is formed on the side of the one surface of the substrate, and a region in which the breath sensor and the introduction pipe are disposed is formed on the side of the other surface.

8. The electronic wind instrument according to claim 6, further comprising:

a drain pipe with a tubular shape of which one end is provided in the cavity and which discharges water in the cavity to an outside, wherein the drain pipe, the introduction pipe, and the elastic member are integrally formed of a rubber-like elastic component.

9. The electronic wind instrument according to claim 5, further comprising:

a cylindrical member which is attached to one end of the instrument main body and in which the blow port is detachably fitted into an outer circumferential surface, wherein the cylindrical member has an outer circumferential surface on which the sealing member is provided and an inner circumferential surface to which the elastic member is fixed.

10. The electronic wind instrument according to claim 9, wherein a length of the blow port fitted into the cylindrical member in an axial direction of the cylindrical member is set to be longer than an outer diameter of the cylindrical member, and wherein a pair of sealing members are provided with a predetermined interval therebetween in the axial direction of the cylindrical member.

11. The electronic wind instrument according to claim 10, wherein the cylindrical member is formed on an inner circumferential surface in a region between the pair of sealing members and includes a fixing part for fixing the elastic member.

12. The electronic wind instrument according to claim 5, further comprising:

a restriction member that regulates contact of the detection unit with the sensor when the blow port is removed from the instrument main body, wherein the blow port is detachably attached to the instrument main body.

* * * * *